US008731608B2

(12) United States Patent
Jung et al.

(10) Patent No.: US 8,731,608 B2
(45) Date of Patent: May 20, 2014

(54) COMMUNICATION METHOD AND APPARATUS OF DUAL STANDBY MODE TERMINAL

(75) Inventors: Ho Jin Jung, Suwon-si (KR); Doo Hwan Lee, Seoul (KR); Seon Jun Kim, Suwon-si (KR); Young Hak Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 13/050,289

(22) Filed: Mar. 17, 2011

(65) Prior Publication Data

US 2011/0287807 A1    Nov. 24, 2011

(30) Foreign Application Priority Data

May 19, 2010    (KR) .................. 10-2010-0046722

(51) Int. Cl.
*H04M 1/00* (2006.01)
(52) U.S. Cl.
USPC ............... 455/553.1; 455/557; 455/550.1; 455/552.1; 455/558

(58) Field of Classification Search
USPC ............... 455/557, 558, 550.1, 552.1, 553.1
See application file for complete search history.

(56) References Cited

U.S. PATENT DOCUMENTS

2004/0203789 A1*  10/2004  Hammond et al. ........... 455/440
2008/0293394 A1*  11/2008  Silver et al. .................. 455/417
2009/0088211 A1*   4/2009  Kim ............................. 455/558

* cited by examiner

*Primary Examiner* — Justin Lee
(74) *Attorney, Agent, or Firm* — Jefferson IP Law, LLP

(57) ABSTRACT

A communication method and apparatus of a dual standby mode mobile terminal for improving the emission performance are provided. The mobile terminal includes a master switch for connecting a master antenna to a master Radio Frequency (RF) unit for communication with a first network, a slave switch for connecting a slave antenna to a slave RF unit for communication with a second network, a slave control unit for controlling communication with the second network and for detecting attachment of a slave Subscriber Identity Module (SIM), and a master control unit for controlling communication with the first network, for detecting attachment of a master SIM, and for controlling the master and slave switches to establish/release either the connection between the master antenna and the master RF unit or the connection between the slave antenna and the slave RF unit.

14 Claims, 6 Drawing Sheets

FIG. 6

A) MASTER ANTENNA PERFORMANCE ENHANCEMENT

| BAND | GSM900 | | | | | | | | MASTER DCS1800 | | | | | | | |
|---|---|---|---|---|---|---|---|---|---|---|---|---|---|---|---|---|
| CH | 975 | | 58 | | 124 | | 512 | | 644 | | 885 | | | | | |
| SECTION | BER | PWR | BER | PWR | BER | PWR | BER | PWR | BER | PWR | BER | PWR |
| ORIGINAL EMISSION PERFORMANCE | -105.56 | 26.73 | -105.29 | 26.27 | -105.33 | 26.62 | -98.20 | 18.86 | -97.92 | 18.09 | -99.48 | 19.75 |
| EMISSION PERFORMANCE WITH SLAVE ANT OPENED | -107.67 | 28.74 | -107.92 | 28.47 | -107.54 | 28.45 | -100.40 | 21.67 | -100.55 | 21.20 | -102.77 | 22.64 |
| ENHANCEMENT | 2.12 | 2.01 | 2.64 | 2.20 | 2.22 | 1.83 | 2.20 | 2.81 | 2.63 | 3.11 | 3.28 | 2.89 |

→ ENHANCEMENT OF 2~3DB WITH SLAVE ANT OPENED PHYSICALLY

B) SLAVE ANTENNA PERFORMANCE ENHANCEMENT

| BAND | GSM900 | | | | | | | | SLAVE DCS1800 | | | | | | | |
|---|---|---|---|---|---|---|---|---|---|---|---|---|---|---|---|---|
| CH | 975 | | 58 | | 124 | | 512 | | 644 | | 885 | | | | | |
| SECTION | BER | PWR | BER | PWR | BER | PWR | BER | PWR | BER | PWR | BER | PWR |
| ORIGINAL EMISSION PERFORMANCE | -101.18 | 20.56 | -100.10 | 21.47 | -99.28 | 21.82 | -94.42 | 17.96 | -94.64 | 17.70 | -94.89 | 15.68 |
| EMISSION PERFORMANCE WITH SLAVE ANT OPENED | -103.66 | 22.94 | -103.63 | 24.44 | -102.45 | 24.21 | -97.84 | 20.09 | -97.86 | 21.61 | -96.42 | 18.12 |
| ENHANCEMENT | 2.48 | 2.38 | 3.52 | 2.97 | 3.16 | 2.39 | 3.41 | 2.14 | 3.22 | 3.91 | 1.53 | 2.44 |

→ ENHANCEMENT OF 2~3DB WITH SLAVE ANT OPENED PHYSICALLY

COMMUNICATION METHOD AND APPARATUS OF DUAL STANDBY MODE TERMINAL

PRIORITY

This application claims the benefit under 35 U.S.C. §119 (a) of a Korean patent application filed on May 19, 2010 in the Korean Intellectual Property Office and assigned Serial No. 10-2010-0046722, the entire disclosure of which is hereby incorporated by reference.

BACKGROUND OF THE INVENTION

1. Field of the Invention

The present invention relates to a dual standby mode mobile terminal More particularly, the present invention relates to a communication method and apparatus of a dual standby mode terminal for improving emission performance by opening at least one circuit to master and slave antennas according to a subscriber identity module activated.

2. Description of the Related Art

Mobile communication systems have been developed to provide subscribers with voice communication services on the move. Recently, the mobile communication systems have evolved to support high speed data communication services as well as basic voice communication services. With an increase of data traffic and user demands for high quality data services, there has been a need to develop a more effective and sophisticated system.

In the meantime, a dual standby mode mobile terminal has been developed to support two different communication systems with a simultaneous attachment of two Subscriber Identity Modules (SIMs) issued by respective systems. This means that the owner of the dual standby mode terminal can subscribe to the services of two individual communication systems. Since the dual standby mode terminal allows attachment of two SIMs, the user can be assigned two different phone numbers with one mobile terminal. Accordingly, the user can enjoy the services of the two different mobile carriers.

However, a conventional dual standby mode terminal has a drawback in that, since two antennas share a ground of a single board, its radio frequency emission performance is low as compared to a normal mobile terminal.

Therefore, a need exists for a dual standby mode terminal that is capable of improving a Radio Frequency (RF) emission performance in the dual standby mode.

SUMMARY OF THE INVENTION

An aspect of the present invention is to address at least the above-mentioned problems and/or disadvantages and to provide at least the advantages described below. Accordingly, an aspect of the present invention is to provide a communication method and apparatus of a dual standby mode terminal that is capable of improving Radio Frequency (RF) emission performance by opening at least one circuit to the master and slave antennas selectively depending on a Subscriber Identity Modules (SIM) activated.

In accordance with an aspect of the present invention, a mobile terminal is provided. The terminal includes a master switch for connecting a master antenna to a master RF unit for communication with a first network, a slave switch for connecting a slave antenna to a slave RF unit for communication with a second network, a slave control unit for controlling communication with the second network and for detecting attachment of a slave subscriber identity module, and a master control unit for controlling communication with the first network, for detecting an attachment of a master subscriber identity module, and for controlling the master and slave switches to establish/release either the connection between the master antenna and the master RF unit or the connection between the slave antenna and the slave RF unit.

In accordance with another aspect of the present invention, a communication method for a mobile terminal is provided. The method includes detecting an attachment of at least one of a master subscriber identity module for a first network and a slave subscriber identity module for a second network, and establishing at least one of connections to a master antenna for the first network and a slave antenna for the second network according to the subscriber identity module attached.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is a diagram illustrating tables showing a performance enhancement of a dual standby mode terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a Subscriber Identity Module (SIM) is a component of a mobile station defined in the Global System for Mobile communication (GSM) standard as one of digital mobile communication standards and is provided in the form of a smartcard that stores information on a subscriber identity and authentication and subscribed services.

In the following description, a switch-on signal denotes a control signal for closing (or shorting) the switch, and a switch-off signal denotes a control signal for opening the switch.

Although the description is directed to a dual standby mode mobile terminal supporting a pair of GSM networks, exemplary embodiments of the present invention are not limited thereto. That is, exemplary embodiments of the present invention may be applied to a dual standby mode terminal configured to support a pair of different networks such as a Code Division Multiple Access (CDMA) network and a GSM network. In this case, the two networks can be called the first and second networks, respectively.

For convenience of understanding the concept of the exemplary embodiments of the present invention, descriptions are directed to a dual standby mode communication supporting two different networks. However, the present invention can be applied to a multi-standby mode terminal supporting more than two networks simultaneously.

Figure 1:
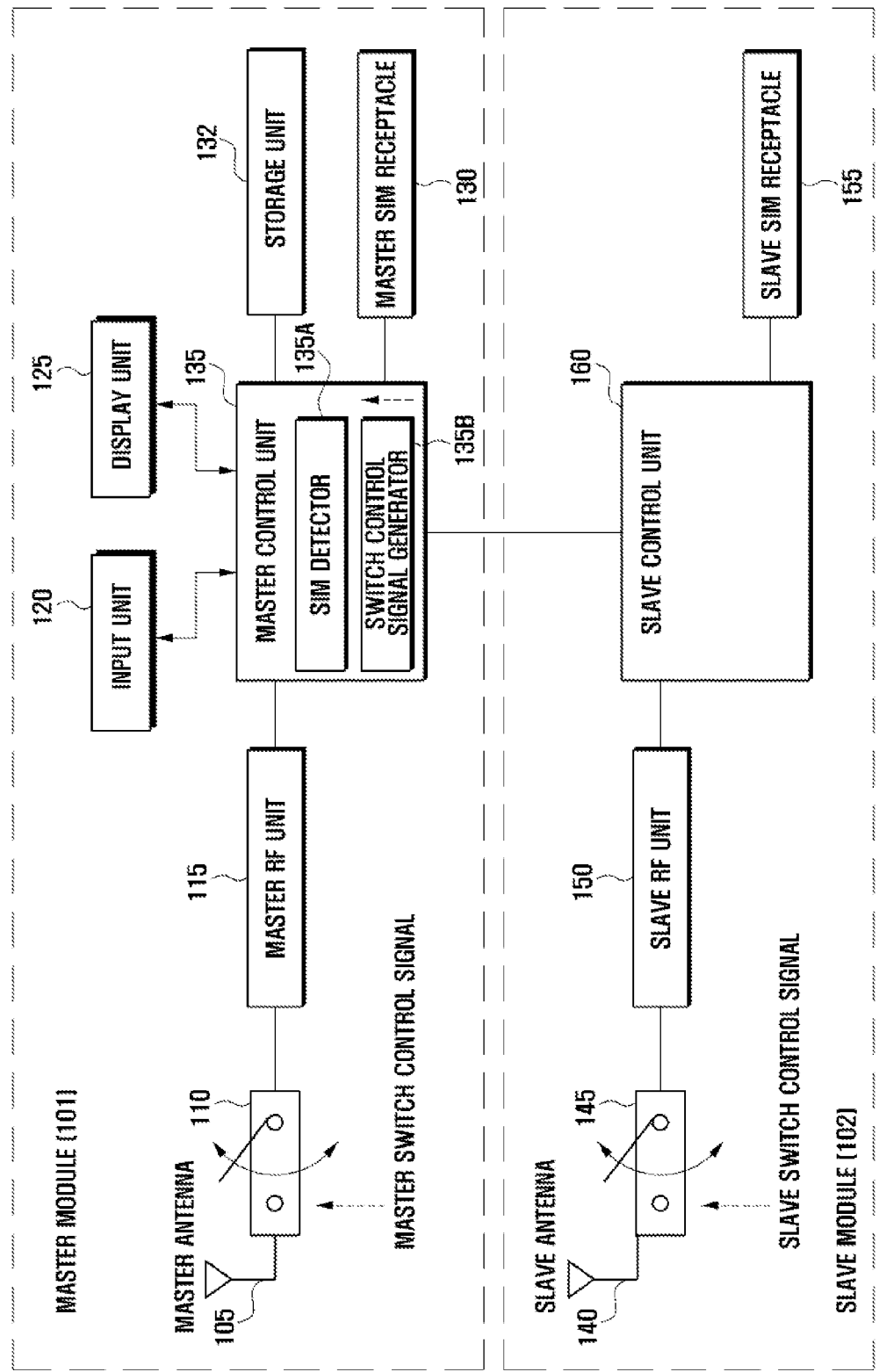
FIG. 1 is a block diagram illustrating a configuration of a dual standby mode terminal according to an exemplary embodiment of the present invention.

FIG. 1 is a block diagram illustrating a configuration of a dual standby mode terminal according to an exemplary embodiment of the present invention.

Referring to FIG. 1, the dual standby mode terminal includes a master module 101 which is responsible for communication in a first network and a slave module 102 which is responsible for communication in a second network. The master module 101 includes a master antenna 105, a master switch 110, a master Radio Frequency (RF) unit 115, an input unit 120, a display unit 125, a master Subscriber Identity Module (SIM) receptacle 130, a storage unit 132, and a master control unit 135. The slave module 102 includes a slave antenna 140, a slave switch 145, a slave RF unit 150, a slave SIM receptacle 155, and a slave control unit 160.

The master antenna 105 receives an electromagnetic wave transmitted by a base station of the first network and delivers the received electromagnetic wave to the master RF unit 115 and radiates the signal received from the master RF unit 115 in the form of an electromagnetic wave. According to an exemplary embodiment of the present invention, the master antenna 105 is physically connected or disconnected to the master RF unit 115 according to the switching operation of the master switch 110.

The master switch 110 is an RF switch placed between the master antenna 105 and the master RF unit 115 to selectively connect the master antenna 105 to the master RF unit 115. The master switch 110 connects or disconnects the master antenna 105 to the master RF unit 115 according to the master switch control signal generated by the master control unit 135.

The master RF unit 115 can include an RF transmitter for up-converting and amplifying the transmit frequency signal and an RF receiver for low noise amplifying and down-converting the receive frequency signal transmitted by the first network. The master RF unit 115 also can receive the control signal and data transmitted by the first network on a radio channel and deliver the received control signal and data to the master control unit 135, and transmits the data output by the master control unit 135 to the first network on the radio channel.

The input unit 120 receives a key manipulation signal input by the user for controlling the dual standby mode terminal and delivers the key manipulation signal to the master control unit 135. The input unit can be implemented with a keypad having a plurality of numeral keys and navigation keys, and a few function keys provided on a side wall of the dual standby mode terminal. According to an exemplary embodiment of the present invention, when two SIMs are inserted to the input unit 120, the input unit 120 detects an input signal for selecting one of the SIMs and outputs the input signal to the master control unit 135.

The display unit 125 can be implemented with a Liquid Crystal Display (LCD) or an Organic Light Emitted Diode (OLED). The display unit 125 provides a menu, input data, function setting information, and other information in a visual format. For example, the display unit 125 displays a booting progress screen, idle mode screen, a presentation screen, a call processing screen, a setting screen, and other application execution screens of the dual standby mode terminal. According to an exemplary embodiment of the present invention, the display unit 125 can be configured, when two SIMs are inserted, to display a SIM selection screen.

The master SIM receptacle 130 receives the SIM dedicated to the first network. The SIM dedicated to the first network can be called a master SIM. The first network authenticates the subscriber to provide the first network mobile communication service with the master SIM.

The storage unit 132 stores the programs and data necessary for the general operations of the dual standby mode terminal according to an exemplary embodiment of the present invention. The storage unit 132 can include a program memory region and a data memory region.

The program memory region stores an Operating System (OS) for booting up the dual standby mode terminal, a program for configuring the idle mode screen of the dual standby mode terminal, and supplementary function programs necessary for a camera function, a sound playback function, and still and motion picture playback functions. In a case where one of the aforementioned functions is activated in response to a user request, the dual standby mode terminal executes the corresponding program.

The data memory region stores data generated during the operation of the dual standby mode terminal such as contents moved or copied from an external memory or hard disc and downloaded from a web server via wired or wireless network. The data memory region can store the user data related to various option settings as well as the media contents.

The master control unit 135 controls entire operations of the dual standby mode terminal according to an exemplary embodiment of the present invention. The master control unit 135 can control the operations related to the communication with the first network. More particularly, the master control unit 135 controls a series of processes for opening the master and slave antennas 105 and 140 physically depending on the inserted SIM. For this purpose, the master control unit 135 is provided with a SIM detector 135A and a switch control signal generator 135B. For convenience of understanding, the SIM detector 135A and the switch control signal generator 135B are described in more detail below after an explanation of function blocks of the slave module 102.

The slave antenna 140 receives the electromagnetic wave transmitted by a base station of the second network and delivers the received electromagnetic wave to the slave RF unit 150 and radiates the signal received from the slave RF unit 150 in the form of an electromagnetic wave. According to an exemplary embodiment of the present invention, the slave antenna 105 is physically connected or disconnected to the slave RF unit 150 according to the switching operation of the slave switch 145.

The slave switch 145 functions as an RF switch placed between the slave antenna 140 and the slave RF unit 150 to selectively connect the slave antenna 140 to the slave RF unit 150. The slave switch 145 connects or disconnects the slave antenna 145 to the slave RF unit 145 according to the slave switch control signal generated by the master control unit 135.

The slave RF unit 150 can include an RF transmitter for up-converting and amplifying the transmit frequency signal and an RF receiver for low noise amplifying and down-converting the receive frequency signal transmitted by the second network. The master RF unit 150 also can receive the control signal and data transmitted by the second network on a radio channel and deliver the received control signal and data to the slave control unit 160 and transmits the data output by the slave control unit 160 to the first network on the radio channel.

The slave SIM receptacle 155 receives the SIM dedicated to the second network. The SIM dedicated to the second network can be called a slave SIM. The second network authenticates the subscriber to provide the second network mobile communication service with the slave SIM.

The slave control unit 160 controls operations related to the communication with the second network. According to an exemplary embodiment of the present invention, the salve control unit 160 delivers the slave SIM detection information to the SIM detector 135A.

A description is made of the operations of the SIM detector 135A and the switch control signal generator 135B for opening the master antenna 105 or the slave antenna 140 physically according to the SIM inserted. Although the description is directed to the operations of the SIM detector 135A and the switch control signal generator 135B, the same operations can be performed by other function blocks or the master controller 135.

The SIM detector 135A detects the SIMs inserted to the master and slave SIM receptacles 130 and 155 and counts a number of SIMs attached currently. For this purpose, the SIM detector 135A can receive from the slave control unit 160 information on whether the slave SIM is attached. In a case where only one SIM is detected at one of the SIM receptacles 130 and 155, the SIM detector 135A determines which of the master and slave SIMs are attached and outputs the determination result to the switch control signal generator 135B.

In a case where both the master and slave SIMs are detected, the SIM detector 135A determines which of the master and slave SIMs is selected by the user and outputs the determination result to the switch control signal generator 135B. It is also possible for the user to select both the master and slave SIMs.

The switch control signal generator 135B generates a switch control signal to open the master and/or slave antennas 105 and 140 physically according to the number of SIMs and the selected SIM.

In more detail, when one SIM is inserted, the switch control signal generator 135B generates a control signal for closing the circuit between the antenna corresponding to the inserted SIM and the master control unit 135. Also, the switch control signal generator 135B generates a control signal for opening the circuit between the antenna corresponding to the non-inserted SIM and the master control unit 134.

Figure 2:
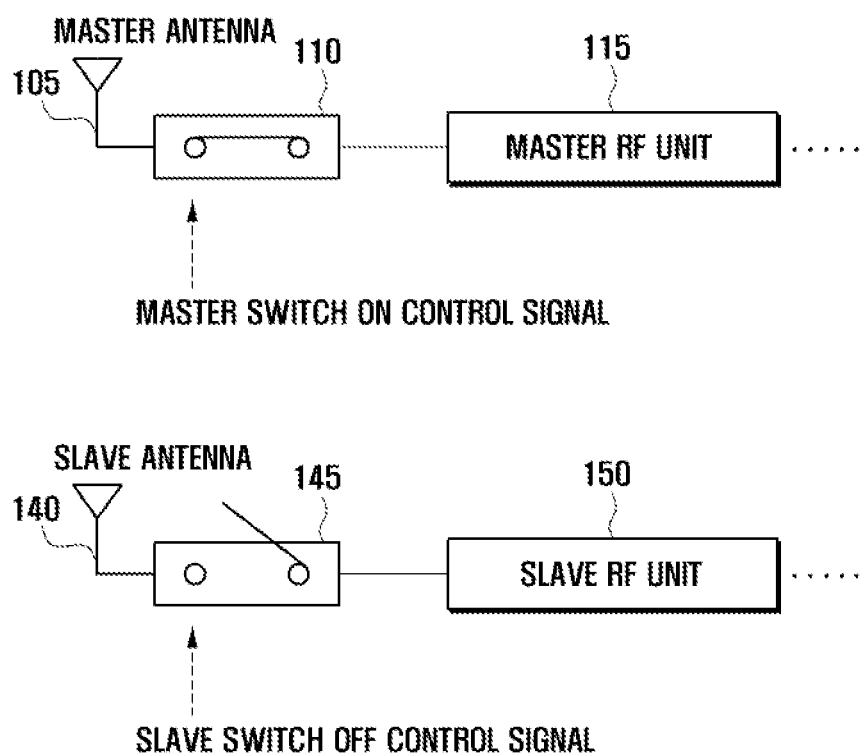
FIG. 2 is a diagram illustrating states of master and slave switches when a dual standby mode terminal is in a first communication mode according to an exemplary embodiment of the present invention.

FIG. 2 is a diagram illustrating states of master and slave switches when a dual standby mode terminal is in a first communication mode according to an exemplary embodiment of the present invention.

Referring to FIG. 2, when the master SIM receptacle 130 receives the master SIM, the switch control signal generator 135B outputs a master switch on control signal such that the master antenna 105 is connected to the master RF unit 115. At this same time, the switch control signal generator 135B also outputs a slave switch off control signal such that the slave antenna 140 is disconnected to the slave RF unit 150.

That is, the master switch 110 establishes the connection between the master antenna 105 and the master RF unit 115, and the slave switch 145 releases the connection between the slave antenna 140 and the slave RF unit 150, as illustrated in FIG. 2.

Figure 3:
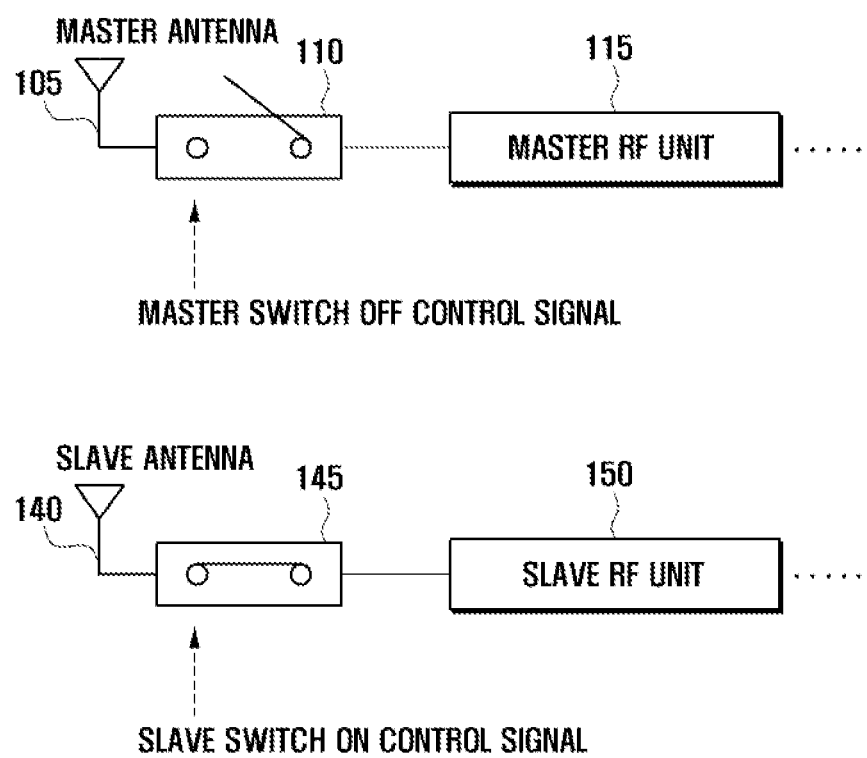
FIG. 3 is a diagram illustrating states of master and slave switches when a dual standby mode terminal is in a second communication mode according to an exemplary embodiment of the present invention.

FIG. 3 is a diagram illustrating states of master and slave switches when a dual standby mode terminal is in a second communication mode according to an exemplary embodiment of the present invention.

Referring to FIG. 3, when the slave SIM receptacle 155 receives the slave SIM, the switch control signal generator 135B outputs a slave switch on control signal such that the slave antenna 140 is connected to the slave RF unit 150. At this time, the switch control signal generator 135B also outputs a master switch off control signal such that the master antenna 105 is disconnected to the master RF unit 115.

That is, the master switch 110 releases the connection between the master antenna 105 and the master RF unit 115, and the slave switch 145 establishes the connection between the slave antenna 140 and the slave RF unit 150, as illustrated in FIG. 3.

Meanwhile, when the master and slave SIM receptacles 130 and 155 receive the respective master and slave SIMs and one of the SIMs is selected, the switch control signal generator 135B generates a switch on control signal for establishing the connection between the antenna and the RF unit both corresponding to the selected SIM. At the same time, the switch control signal generator 135B also generates a switch off control signal for releasing the connection between the antenna and the RF unit both corresponding to the non-selected SIM.

For example, when both the master and slave SIMs are inserted and the subscriber selects the master SIM, the switch control signal generator 135B generates the master switch on control signal and the slave switch off control signal. In this case, the master and slave switches 110 and 145 operate as illustrated in FIG. 2.

In contrast, when the subscriber selects the slave SIM of the two inserted SIMs, the switch control signal generator 135B generates the master switch off control signal and the slave switch on control signal. In this case, the master and slave switches 110 and 145 operate as illustrated in FIG. 3.

Figure 4:
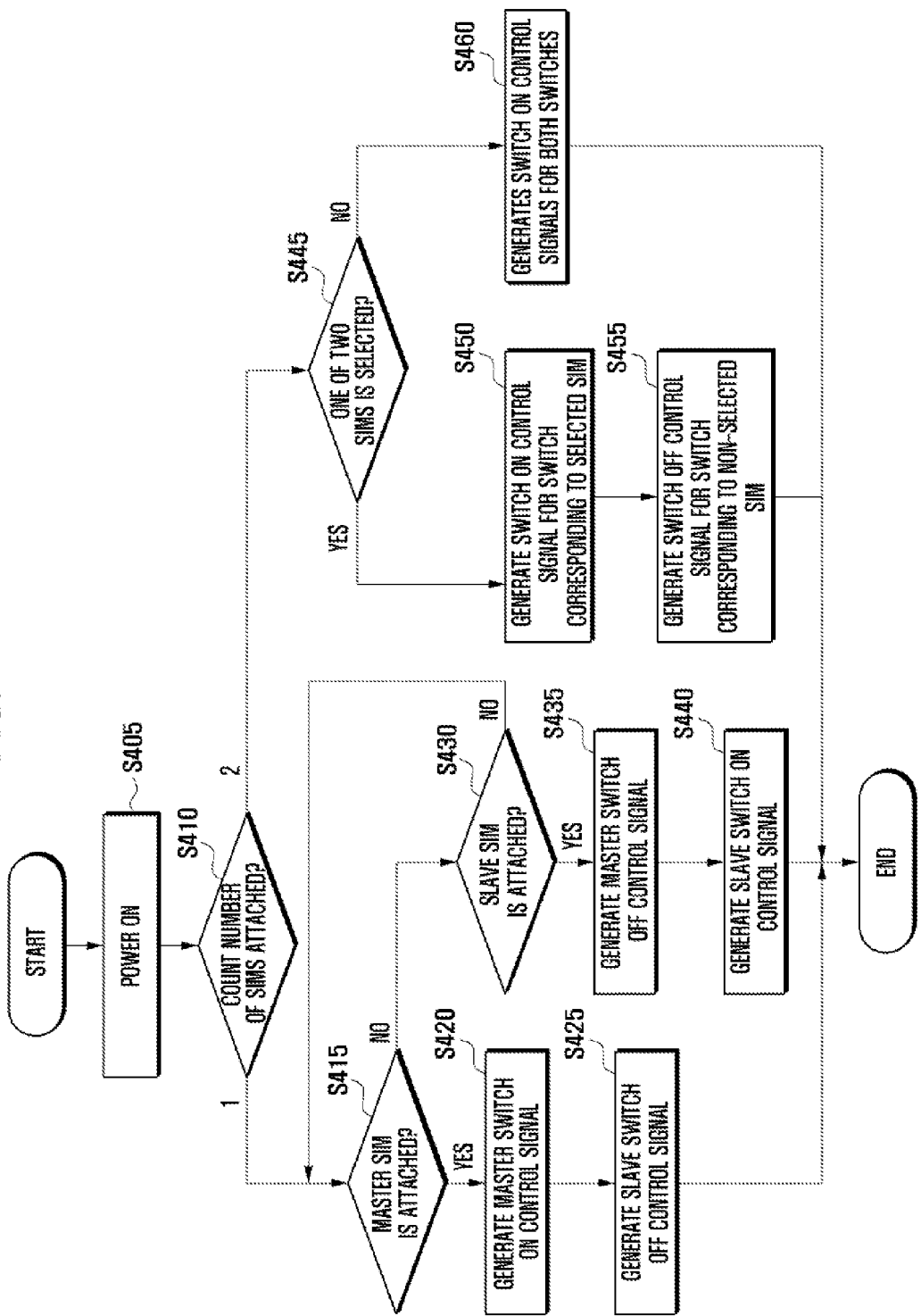
FIG. 4 is a flowchart illustrating a communication mode configuration method for a dual standby mode terminal according to an exemplary embodiment of the present invention.

FIG. 4 is a flowchart illustrating a communication mode configuration method for a dual standby mode terminal according to an exemplary embodiment of the present invention.

Referring to FIG. 4, the dual standby mode terminal powers on at step S405. Once the dual standby mode terminal powers on, the SIM detector 135A counts a number of SIMs attached to the dual standby mode terminal at step S410. If the number of attached SIMs is 1, the SIM detector 135A determines whether the attached SIM is the master SIM or the slave SIM at steps S415 and S430. If it is determined that the master SIM is attached, the switch control signal generator 135B generates a master switch on control signal at step S420. Next, the switch control signal generator 135B also generates a slave switch off control signal at step S425. Consequently, the master switch 110 establishes the connection between the master antenna 105 and the master RF unit 115, and the slave switch 145 releases the connection between the slave antenna 140 and the slave RF unit 150.

If it is determined that the slave SIM is attached at step S430, the switch control signal generator 135B generates a master switch off control signal at step S435. Next, the switch control signal generator 135B generates a slave switch on control signal at step S440. Consequently, the master switch 110 releases the connection between the master antenna 110 and the master RF unit 115, and the slave switch 145 establishes the connection between the slave antenna 140 and the slave RF unit 150.

If it is determined that the number of attached SIMs is 2, the SIM detector 135A determines whether any of the two SIMs is selected at step S445. If any of the two SIMs is selected, the SIM detector 135A notifies the switch control signal generator 135B of the selected SIM.

Once the switch control signal generator 135B is notified that any of the two SIMs is selected, it generates the switch on control signal to establish the connection between the antenna and RF unit corresponding to the selected SIM at step S450. Next, the switch control signal generator 135B generates the switch off control signal to release the connection between the antenna and RF unit corresponding to the non-selected SIM at step S455.

For example, if the master SIM is selected, the switch control signal generator 135B generates the master switch on control signal and the slave switch off control signal. Otherwise, if the slave SIM is selected, the switch control signal generator 135B generates the master switch off control signal and the slave switch on control signal.

If none of the two SIMs is selected, the switch control signal generator 135B generates the master switch on signal and the slave switch on signal at step S460.

Figure 5:
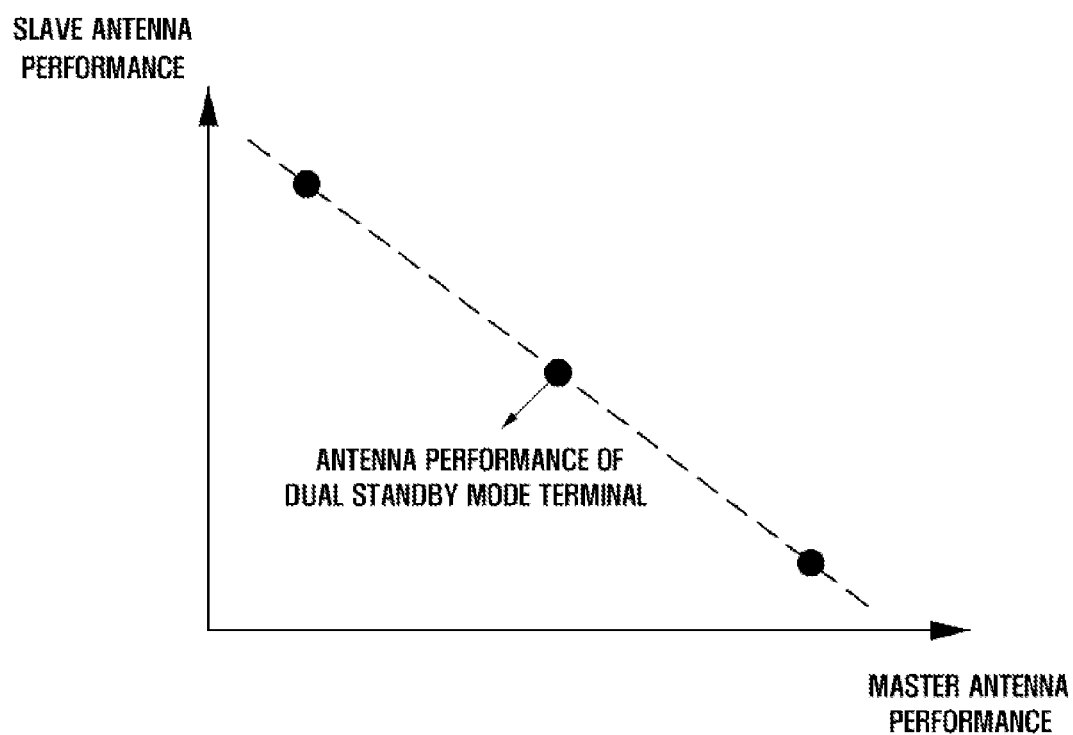
FIG. 5 is a graph illustrating antenna emission performance comparison between a conventional dual standby mode terminal and a dual standby mode terminal according to an exemplary embodiment of the present invention.

FIG. 5 is a graph illustrating antenna emission performance comparison between a conventional dual standby mode terminal and a dual standby mode terminal according to an exemplary embodiment of the present invention.

In the conventional dual standby mode terminal, two antennas responsible for different networks share a ground on one board. In this case, the emission performances of the master and slave antennas have an inverse proportional relationship in which the emission performance of the slave antenna is decreased when the emission performance of the master antenna increase and vice versa. This relationship can be depicted as an inverse proportion graph as illustrated in FIG. 5. Accordingly, the conventional dual standby mode terminal is configured with the average emission performances of the master and slave antennas, resulting in degradation of the antenna emission performance as compared to a single standby mode terminal.

FIG. 6 is a diagram illustrating tables showing a performance enhancement of a dual standby mode terminal according to an exemplary embodiment of the present invention.

Referring to FIG. 6, Table A) shows emission performance of a master antenna 105 when the circuit to a slave antenna 140 is opened. As shown in Table A) of FIG. 6, both Bit Error Rate (BER) and Power (PWR) performances of the master antenna 105 have been enhanced when the circuit to the slave antenna 140 was opened.

Table B) of FIG. 6 shows the emission performance of the slave antenna 140 when the circuit to the master antenna 105 is opened. As shown in Table B) of FIG. 6, both the BER and PWR performances of the slave antenna 140 have been enhanced when the circuit to the master antenna 105 was opened.

As described above, the communication mode control method and apparatus of a dual standby mode terminal opens the circuit to the master antenna or the salve antenna physically according to the attached SIM such that it is possible to improve the antenna emission performance in a case where the master and slave antenna share a ground of a board.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A mobile terminal comprising:
   a master switch configured to connect a master antenna to a master Radio Frequency (RF) unit for communication with a first network;
   a slave switch configured to connect a slave antenna to a slave RF unit for communication with a second network;
   a slave control unit configured to control communication with the second network and configured to detect an attachment of a slave subscriber identity module; and
   a master control unit configured to control the slave control unit, configured to control communication with the first network, configured to detect an attachment of a master subscriber identity module, and configured to control the master and slave switches to establish/release either the connection between the master antenna and the master RF unit or the connection between the slave antenna and the slave RF unit according to attached subscriber identity module.

2. The mobile terminal of claim 1, wherein the master control unit generates switch control signals for establishing the connection between the antenna and the RF unit which both correspond to the attached subscriber identity module for communication with the corresponding network and for releasing the connection between the antenna and RF unit which both correspond to non-attached subscriber identity module.

3. The mobile terminal of claim 2, wherein the master control unit generates, when the master subscriber identity module is attached, a master switch on control signal and a slave switch off control signal.

4. The mobile terminal of claim 2, wherein the master control unit generates, when the slave subscriber identity module is attached, a master switch off control signal and a slave switch on control signal.

5. The mobile terminal of claim 2 further comprising:
   a display unit for displaying, when both the master subscriber identity module and the slave subscriber identity module are attached, a selection screen allowing selection of one of the master subscriber identity module and the slave subscriber identity module; and an input unit for receiving an input for selecting one of the master identity module and the slave identity module.

6. The mobile terminal of claim 5, wherein the master control unit generates, when an input for selecting the master subscriber identity module is detected, a master switch on control signal and a slave switch off control signal.

7. The mobile terminal of claim 5, wherein the master control unit generates, when an input for selecting the slave subscriber identity module is detected, a master switch off control signal and a slave switch on control signal.

8. The mobile terminal of claim 5, wherein the master control unit generates, when no input is detected for selecting at least one of the master subscriber identity module and the slave subscriber identity module, a master switch on control signal and the slave switch on control signal.

9. A communication method for a mobile terminal, the method comprising:

detecting an attachment of at least one of a master subscriber identity module for a first network and a slave subscriber identity module for a second network; and establishing at least one connection to a master antenna for the first network and a slave antenna for the second network according to the attached subscriber identity module, wherein the establishing of the at least one connection comprises:

establishing the connection to the antenna for communication with the network corresponding to the attached subscriber identity module; and releasing the connection to the antenna for the communication with the network corresponding to a non-attached subscriber identity module.

10. The communication method of claim 9, wherein the establishing of at least one connection comprises closing, when the master subscriber identity module is attached, a circuit to the master antenna and opening a circuit to the slave antenna.

11. The communication method of claim 9, wherein the establishing of at least one connection comprises opening, when the slave subscriber identity module is attached, a circuit to the master antenna and closing a circuit to the slave antenna.

12. The communication method of claim 9, wherein the detecting of the attachment comprises selecting, when both the master subscriber identity module and the slave subscriber identity module are attached, one of the master subscriber identity module and the slave subscriber identity module in response to a user input.

13. The communication method of claim 12, wherein the establishing of at least one connection comprises closing, when the master subscriber identity module is selected, a circuit to the master antenna and opening a circuit to the slave antenna.

14. The communication method of claim 12, wherein the establishing of at least one connection comprises opening, when the slave subscriber identity module is selected, a circuit to the master antenna and closing a circuit to the slave antenna.

* * * * *